(12) United States Patent
Kim

(10) Patent No.: US 11,958,080 B2
(45) Date of Patent: Apr. 16, 2024

(54) PARCEL SORTING SYSTEM

(71) Applicants: DAESUNG INDUSTRIAL CO., LTD, Seoul (KR); YOUNG CONSULTING LTD., Seoul (KR); Young Tae Kim, Seoul (KR)

(72) Inventor: Young Tae Kim, Seoul (KR)

(73) Assignees: Young Tae Kim, Seoul (KR); DAESUNG INDUSTRIAL CO., LTD, Seoul (KR); YOUNG CONSULTING LTD., Seoul (KR)

(*) Notice: Subject to any disclaimer, the term of this patent is extended or adjusted under 35 U.S.C. 154(b) by 193 days.

(21) Appl. No.: 17/437,818

(22) PCT Filed: Jun. 10, 2020

(86) PCT No.: PCT/KR2020/007490
§ 371 (c)(1),
(2) Date: Sep. 9, 2021

(87) PCT Pub. No.: WO2020/262851
PCT Pub. Date: Dec. 30, 2020

(65) Prior Publication Data
US 2022/0152656 A1 May 19, 2022

(30) Foreign Application Priority Data
Jun. 26, 2019 (KR) .......... 10-2019-0076223

(51) Int. Cl.
*B07C 3/08* (2006.01)
*B07C 3/14* (2006.01)
*B65G 23/00* (2006.01)
*B65G 43/08* (2006.01)
*B65G 47/12* (2006.01)
*B65G 47/49* (2006.01)

(52) U.S. Cl.
CPC .......... *B07C 3/08* (2013.01); *B07C 3/14* (2013.01); *B65G 43/08* (2013.01); *B65G 47/12* (2013.01); *B65G 47/493* (2013.01); *B65G 2203/0216* (2013.01); *B65G 2203/0233* (2013.01); *B65G 2203/041* (2013.01)

(58) Field of Classification Search
None
See application file for complete search history.

(56) References Cited

U.S. PATENT DOCUMENTS 6,076,683 A 6/2000 Okada et al.
2014/0091015 A1* 4/2014 Kim .......... B07C 5/00
209/552

FOREIGN PATENT DOCUMENTS

| CN | 108855954 A | 11/2018 |
|---|---|---|
| CN | 202080012444.0 | 8/2022 |
| JP | 08-173583 A | 7/1996 |
| JP | 2853855 B2 | 2/1999 |

(Continued)

*Primary Examiner* — Jacob S. Scott
*Assistant Examiner* — Miraj T. Patel
(74) *Attorney, Agent, or Firm* — PARK LAW FIRM

(57) ABSTRACT

The present invention relates to a parcel sorting system which is operated using two separate tracks so as to distinguish between concentrated population areas and other areas, and feed and sort only parcels destined for a corresponding area, whereby parcel sorting can be efficiently performed, and the system can be efficiently constructed while occupying a small area.

11 Claims, 5 Drawing Sheets

(56) References Cited

FOREIGN PATENT DOCUMENTS

| | | |
|---|---|---|
| JP | 2001-520934 A | 11/2001 |
| KR | 10-1212445 B1 | 12/2012 |
| KR | 10-2014-0066934 A | 6/2014 |
| KR | 10-2014-0075085 A | 6/2014 |
| KR | 10-1546408 B1 | 8/2015 |
| KR | 10-2016-0063019 A | 6/2016 |
| KR | 10-2017-0047844 A | 5/2017 |
| KR | 10-1951412 B1 | 2/2019 |

* cited by examiner

PARCEL SORTING SYSTEM

BACKGROUND OF THE DISCLOSURE

Field of the Disclosure

The present disclosure relates to a parcel sorting system and, more particularly, to a parcel sorting system that is operated in two separate tracks to discriminate densely populated areas and other areas and to put in and sort only parcels for a corresponding area.

Related Art

The amount of parcels is increasing every year with the development of the delivery industry. Accordingly, parcel sorting systems are used to efficiently sort parcels at mail centers or distribution centers. Recently, new sorting apparatuses such as a cross-belt type and an E-Tray type have been developed and generally used to increase the amount of articles that are handled and to sort parcels from small sizes to large sizes.

In general, a parcel sorting system is composed of mechanical apparatus structure that is hardware and operating software that manages operation of a controller for controlling the mechanical apparatus, an information processing and sorting device for sorting. In detail, the mechanical apparatus is composed of a supply conveyor belt that puts in articles, and induction that puts in and supplies articles transmitted from the conveyor belt to a sorter at a high speed, a carrier (or a tray) that carries the articles supplied to the sorter to a sorting section chute, a track for mounting and operating the carrier, a chute through which articles are sorted and discharged in accordance with the destinations.

That is, a large-quantity parcel sorting system is configured in an open or closed ring type, in which a track or a loop is installed at the ring part and chutes are disposed at the edge of the ring. A large amount of parcels is continuously put onto the track of the parcel sorting system, the parcels that are automatically sorted are classified according to destinations, and the classified parcels are carried to delivery sections, loaded on predetermined trucks, and then sent to the destinations.

A parcel sorting system has been disclosed in Korean Patent Application Publication No. 10-2014-0042992 in the related art. As shown in FIG. 1, the parcel sorting system includes: a detection unit 40 that outputs detection signals sg for the length of parcels on conveyor belts 30, 32, and 34 so that the parcels 10 are put in predetermined regions on a cross-belt 20 and are easily discharged at target discharge positions; a cross-belt driving unit 22 that controls a motor operating with the cross-belt 20 including a central region into which the parcels are moved and arranged from the conveyor belt 30 and first and second side regions adjacent to both sides from the central region; and a controller 44 that transmits a motor control signal sc for controlling at least one of the RPM and the rotation speed of the motor to the cross-belt driving unit on the basis of the detection signal so that the parcels are arranged in any one region of the central region and the first and second side regions.

Existing parcel sorting systems have been known to require a wide space for installation and to be configured as a single floor, so a wide space is needed to install sorting section chutes by a needed number, and a track having a sufficient length should be configured, whereby there is a problem that the spatial usability is low. Accordingly, studies about a parcel sorting system having a new structure have been recently actively conducted, using the act that since the areas occupied by existing delivery centers are limited and it is possible to secure sufficient spaces in the air.

Meanwhile, in general, at local delivery centers, all parcels for corresponding locations are generally received, and generally supplied to a parcel sorting system and then sorted by destination groups, so there is a problem that conveyor belts and cross-belts should be operated without stopping. Due to city centralization that is a natural tendency, an area is divided into densely populated large districts and small districts having low population density and being scattered in a wide area. It is required to increase efficiency of putting in and sorting parcels by separately handling parcels for these districts.

SUMMARY OF THE DISCLOSURE

The present disclosure has been made in an effort to solve the problems of the related art described above and since densely populated large city districts and other small city districts with a small population are recently classified even in a relevant zone of life due to specific large city centralization, an objective of the present disclosure is to separately put parcels corresponding to these districts into a parcel sorting system and sort the parcels.

Further, another object of the present disclosure is to improve the handling capacity per area because the area occupied by a parcel sorting system is limited in a delivery center.

A parcel sorting system of the present disclosure for achieving the objects includes: a track driven in a cross-belt type; a loading line loading and conveying parcels by the piece or in a pile to be sorted to the track; a loading line induction putting parcels supplied by the loading line to the track; carriers disposed on the track and moved by operation of the track with the parcels thereon which have been put in by the loading line induction; a plurality of chutes disposed along the track so that the parcels on the track are discharged by the same destination groups; a 5-face image processor disposed at a side of the track, reading out parcel information marked on the top and sides of parcels, and sensing the positions of parcels on the track; a feedback line putting parcels not read out by the 5-face image processor back to the track; and a controller determining chutes for discharging parcels using the parcel information transmitted from the 5-face image processor, in which the track includes a pair of first and second tracks provided to handle parcels for parcel-dense areas and parcels for other areas, respectively, and the parcel sorting system further includes: a shortcut line connecting the first and second tracks so that parcels, which are not parcels for a corresponding area and have been put in wrong, can be conveyed to another track; and a shortcut line induction putting parcels supplied by the shortcut line to the track.

Further, a plurality of metering conveyors is spaced apart from each other and sequentially disposed at a partial section before parcels enter the loading line induction of the loading line; and the parcel sorting system includes a 1-face image processor installed under the metering conveyors, reading out the parcel information marked on the bottom of the parcel through the gap between the metering conveyors, and then transmitting the parcel information to the controller.

Further, simultaneously with reading-out by the 1-face image processor, a parcel identification number is sequentially given to parcels that are put to the loading line, and a sensor unit that measures and transmits lengths of parcels given the parcel identification numbers to the controller is disposed at each parcel inlet of the metering conveyors.

Further, the controller compares in real time tracking information including the parcel identification numbers and lengths of parcels sequentially conveyed along the metering conveyors and deletes the parcel identification numbers of parcels having a predetermined difference from initially measured length values; and gives a parcel identification number starting with a newly classified number level to a parcel that is put to the track with the parcel identification number deleted in cooperation with the 5-face image processor provided for the track.

Further, metering conveyors are spaced apart from each other and sequentially disposed at a partial section before entering the shortcut line induction of the shortcut line; and a 3-face image processor that reads out parcel information marked on parcels is disposed at a side of the metering conveyor, it is determined whether parcel information at the track sending a parcel to the shortcut line and parcel information read out by the metering conveyor of the shortcut line receiving the parcel coincide with each other, and when the items of information do not coincide with each other, the parcel is given a parcel identification number starting with a newly classified number level.

Further, a sensor unit that measures and transmits lengths of parcels given parcel identification numbers to the controller is disposed at each parcel inlet of the metering conveyors; and the controller compares in real time tracking information including the parcel identification numbers and lengths of parcels sequentially conveyed along the metering conveyors, and puts parcels having a predetermined difference from initially measured length values to the track with the parcel identification numbers of the parcels deleted, and then gives parcel identification numbers starting from a newly classified number level in cooperation with the 5-face image processor provided for the track.

Further, the track composed of the first and second tracks is installed in a plurality of stages up and down along a vertical frame; and the chute provided along the first and second tracks at each stage has an inlet into which parcels are put at each stage and connects the stages such that parcels are discharged to one outlet provided under the lowermost stage.

Further, the shortcut line is composed of first and second shortcut lines at each stage, the first shortcut line sends parcels from the second track to the first track, and the second shortcut line sends parcels from the first track to the second track.

Further, small-size and light parcels are put to the upper track of the tracks, which are provided in a plurality stages, in a large quantity through a tipper without a worker.

Further, the loading line, the feedback line, and the shortcut line including the tracks, which are provided in a plurality of stage, and configured as conveyors are connected and hung in the air by beam supporters and hangers vertically extending from transverse sub-beams of the ceiling of a building in which the system is supposed to be installed, and are configured to operate across each other or in parallel with each other.

DESCRIPTION OF EXEMPLARY EMBODIMENTS

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the disclosure.

Therefore, the configurations described in the embodiments and drawings of the present disclosure are merely most preferable embodiments but do not represent all of the technical spirit of the present disclosure. Thus, it should be understood that the present disclosure should be construed as including all the changes, equivalents, and substitutions included in the spirit and scope of the present disclosure at the time of filing this application.

Hereinafter, exemplary embodiments of the present disclosure are described in detail with reference to the accompanying drawings.

Figure 1:
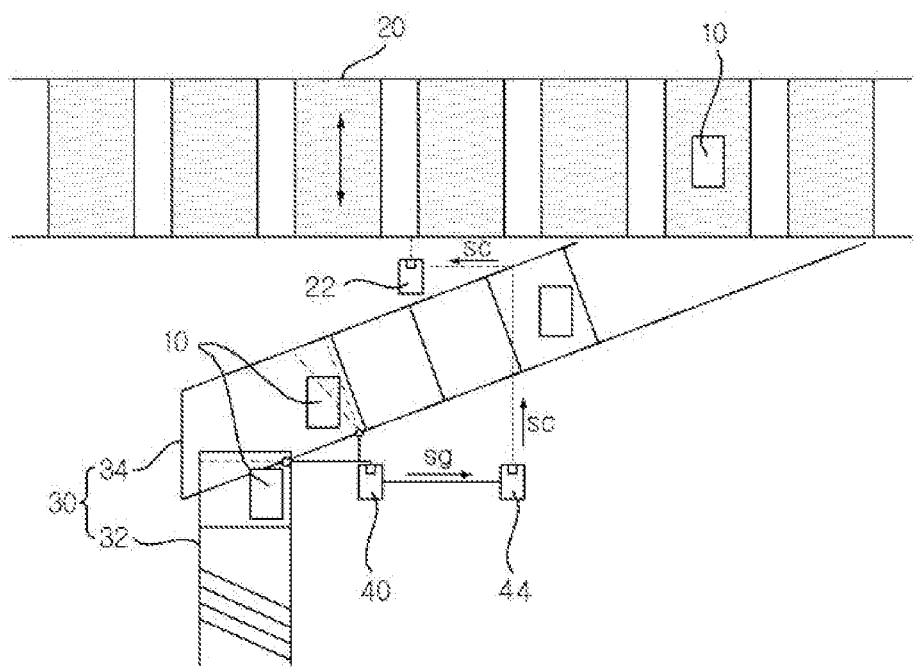
FIG. 1 is a view schematically showing the configuration of a parcel sorting system of the related art.
Figure 2:
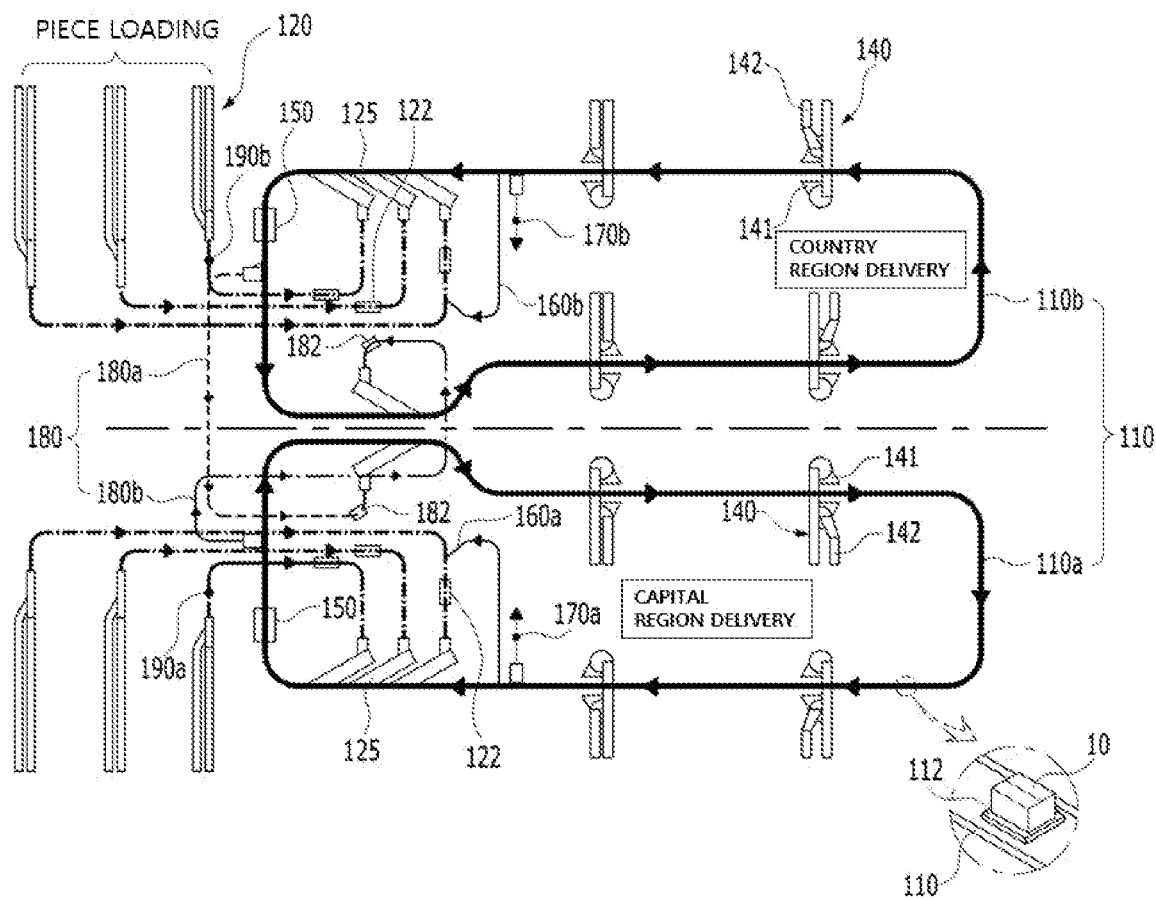
FIG. 2 is a view showing the configuration of a first stage of a parcel sorting system according to an embodiment of the present disclosure.
Figure 3:
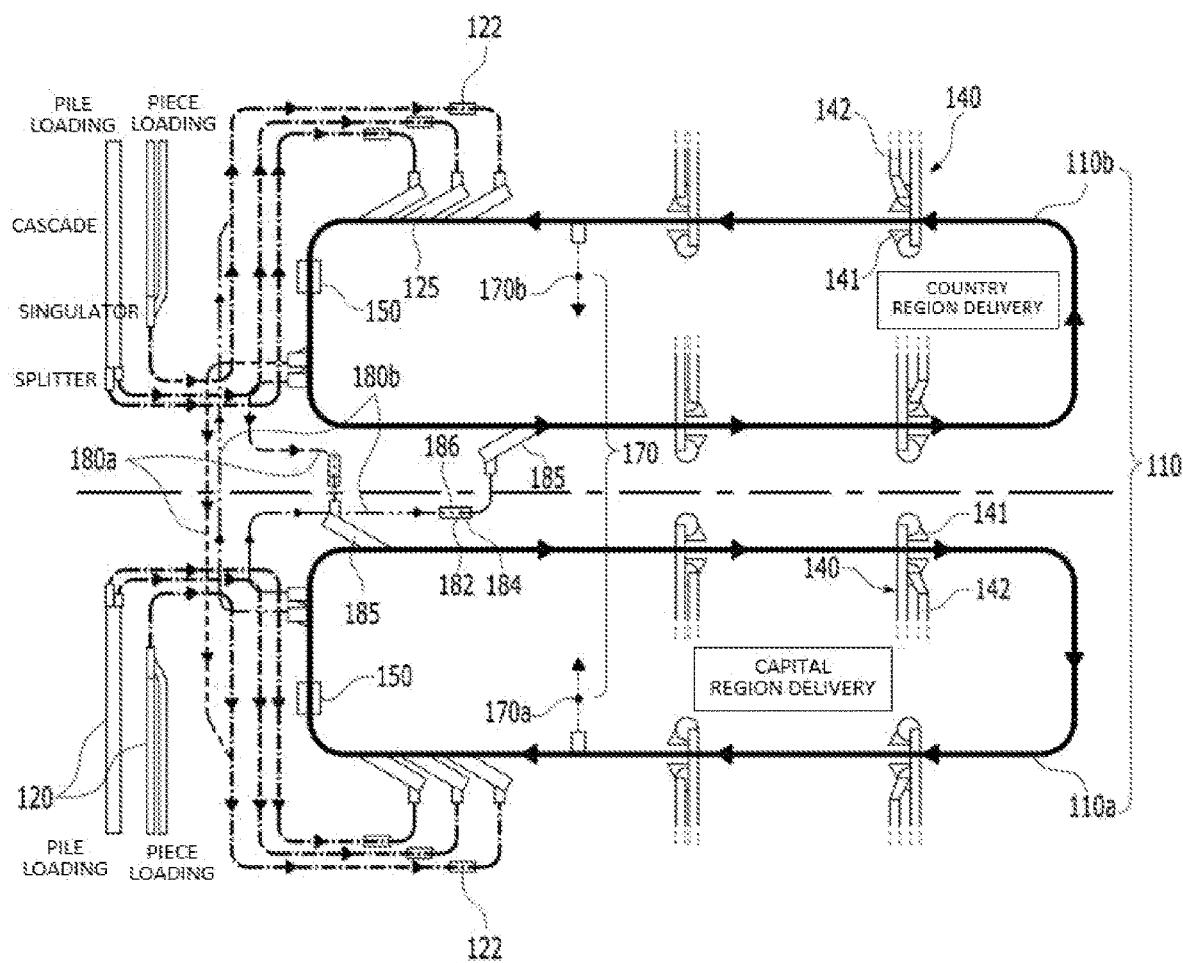
FIG. 3 is a view showing the configuration of a second stage of the parcel sorting system according to an embodiment of the present disclosure.
Figure 4:
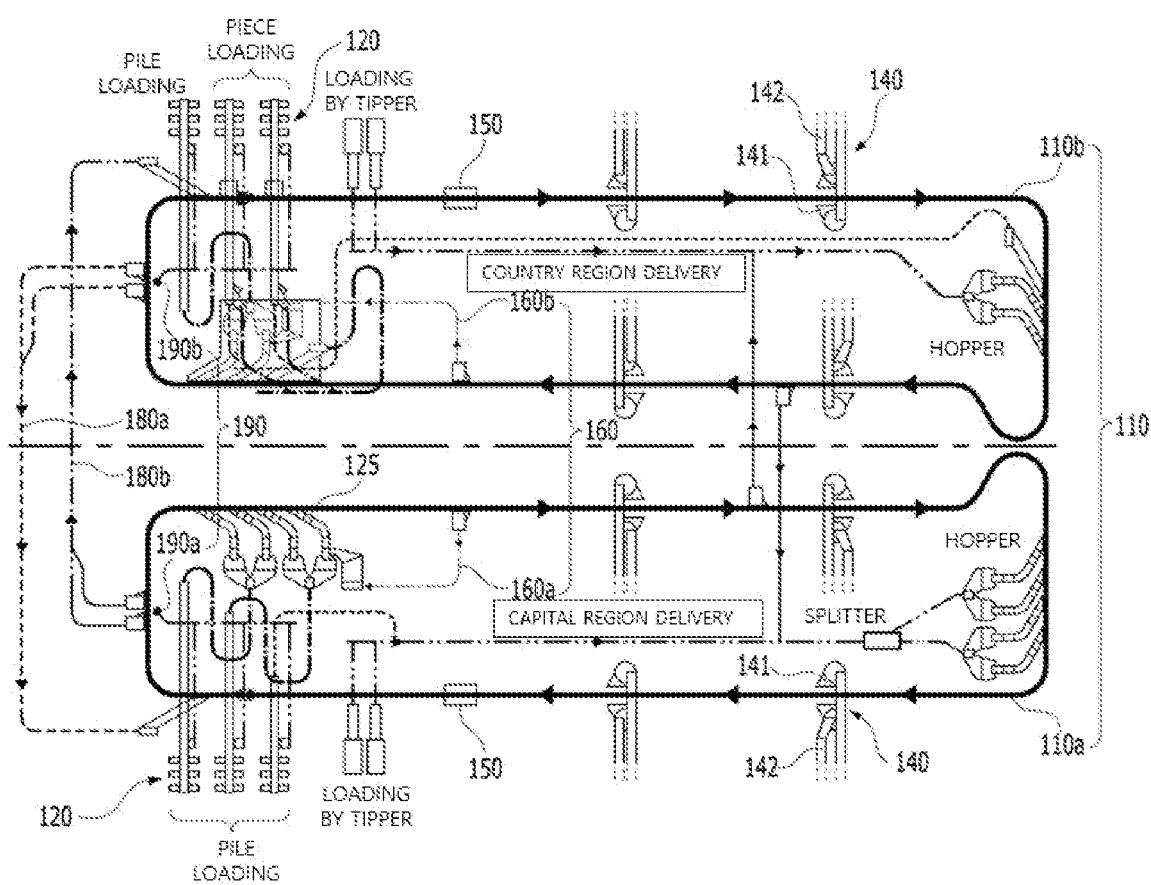
FIG. 4 is a view showing the configuration of a third stage of the parcel sorting system according to an embodiment of the present disclosure.
Figure 5:
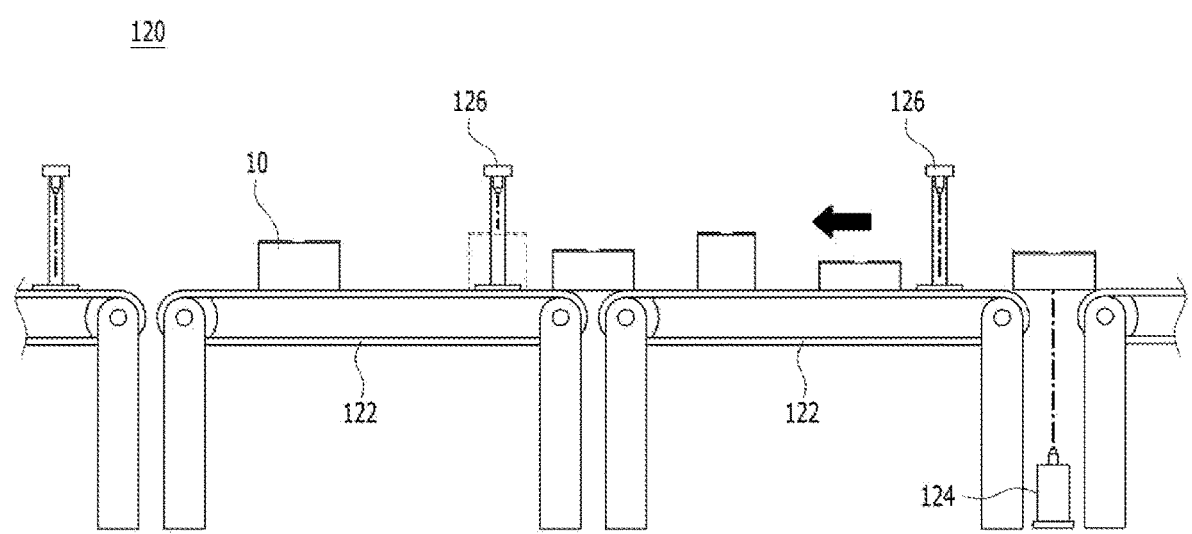
FIG. 5 is a detailed configuration view of a loading line in the parcel sorting system according to an embodiment of the present disclosure.

FIGS. 2 to 4 are views showing the configuration of stages (a first stage, a second stage, and a third stage) of a parcel sorting system according to an embodiment of the present disclosure, respectively, and FIG. 5 is a view showing the detailed configuration of a loading line in the parcel sorting system according to an embodiment of the present disclosure.

As shown in the figures, a parcel sorting system of the present disclosure includes: a track 110 driven in a cross-belt type; a loading line 120 loading and conveying parcels 10 to be sorted to the track 110; a loading line induction 125 putting parcels supplied by the loading line 120 to the track 110; carriers 112 disposed on the track 110 and moved by operation of the track 110 with the parcels thereon which have been put in by the loading line induction 125; a plurality of chutes 140 disposed along the track 110 so that the parcels on the track 110 are discharged by the same destination groups; a 5-face image processor 150 disposed at a side of the track 110, reading out parcel information marked on the top and sides of parcels, and sensing the positions of parcels on the track 110; and a controller (not shown) determining chutes 140 for discharging parcels using the parcel information transmitted from the 5-face image processor 150.

The system further includes a feedback line 160 for putting parcels, which have not been read out by the 5-face image processor 150, back to the track 110.

The track 110 includes a pair of first and second tracks 110a and 110b provided to handle parcels for parcel-dense areas and parcels for other areas, respectively. The system further includes: a shortcut line 180 connecting the first track 110a and the second track 110b so that parcels, which are not parcels for a corresponding area and have been put in wrong, can be conveyed to another track 110; and a shortcut line induction 185 putting parcels supplied by the shortcut line 180 to the track 110.

In detail, the track 110 is driven in a cross-belt type, in which an open or closed annular loop is circulated by a conveyor wheel motor system.

Meanwhile, the track 110 includes a pair of first and second tracks 110*a* and 110*b* that separately receives and handles parcels for parcel-dense areas and parcels for other areas, respectively, and receives parcels through the loading line induction 125, the shortcut line induction 185, etc.

The loading line 120 is configured by a conveyor and loads and conveys parcels unloaded from a vehicle such that the parcels are continuously supplied to the loading line induction 125.

The loading line induction 125 puts parcels continuously supplied by the loading line 120 to the track 110 such that the parcels are loaded on the carriers 112 on the first and second tracks 110*a* and 110*b*.

The number or kind of the loading line 120 may be varied, but, according to the embodiment shown in the figures, the first stage is composed of 12 piece loading lines, the second stage is composed of 2 pile loading lines and 4 piece loading lines, and the third stage is composed of 8 pile loading lines (including tippers) and 2 piece loading lines.

Meanwhile, the loading line 120 is configured such that a plurality of metering conveyors 122 is spaced apart from each other and sequentially disposed at a partial section before parcels are put to the loading line induction 125. The metering conveyor 122 is an array of small conveyors sequentially spaced apart from each other to measure and read out parcels. The gap between the first and second metering conveyors 122 is larger than other gaps and a 1-face image processor 124 is disposed under the first and second metering conveyors 122 to be able to read out parcel information marked on the bottoms of the parcels 10 passing over the 1-face image processor 124 through the gap between the metering conveyors 122, and the read-out parcel information is transmitted to the controller.

The 1-face image processor 124 can read out parcel information on the bottoms of parcels through a reflective mirror (not shown), etc.

Since one side of substantially hexahedral parcels that are moved on the cross-belt type track 10 (the portion of parcels being in contact with the track, that is, the bottom) cannot be scanned, the 1-face image processor 124 provided for the loading line 120 and the 5-face image processor 150 provided for the track 110 are operated together so that parcel information (a barcode, destination information, etc.) can be read out from all the six sides of parcels that are moved on the conveyor.

In the related art, since it was impossible to take an image of the bottom of a parcel on a cross-belt, workers had to manually put parcels onto a conveyor one by one, that is, workers manually put parcels onto a conveyor one by one such that barcodes were as visible as possible on the top or sides.

The present disclosure has paved the way for making it possible to supply parcels in bulk without workers manually arranging the parcels by making it possible to take an image from the bottom and process the image. For example, even if a large quantity of parcels is simultaneously put in without marks on the parcels arranged through a singulator, it is possible to read all the six sides, so it is possible to considerably reduce the manpower and supply time for supplying parcels, sorting time, etc.

Meanwhile, simultaneously with or after reading-out by the 1-face image processor 124, a parcel identification number (PID) is sequentially given to the parcels that are put to the loading line 120, and a sensor unit 126 that measures and transmits the lengths of the parcels given the parcel identification numbers by the 1-face image processor 124 to the controller is disposed at each parcel inlet of the metering conveyors 122.

The controller receives in real time tracking information, which includes the parcel identification numbers and the lengths (and/or volumes) of parcels sequentially conveyed through the metering conveyors 122 from the sensor unit 126, compares the tracking information in real time, and deletes the parcel identification numbers of parcels having a problem due to a predetermined difference from the initially measured length values, thereby preventing a phenomenon that the parcel identification numbers are pushed back due to the following parcels.

While the controller controls the 1-face image processor 124, the 5-face image processor 150, the 3-face image processor 184, etc., the controller receives read-out parcel information from them and participates in deleting parcel identification numbers or giving new parcel identification numbers.

Parcels that are put to the track 110 with the parcel identification numbers deleted in the tracking procedure by the sensor unit 126 are given parcel identification numbers starting with a newly classified number level in cooperation with the 5-face image processor 150 provided for the track 110 (for example, when identification numbers are given from the 100 level in the loading line 120, the identification numbers that are newly given on the track 110 start from the 700 level).

Although the configuration in which the sensor units 126 and 186 that perform a tracking procedure and the image processors 124 and 184 that scan images are separated was described as an embodiment, only any one of the sensor units 126 and 186 and the image processors 124 and 184 may be provided to perform both of the tracking procedure and the image reading-out procedure.

A plurality of carriers 112 is positioned in a line on the track 110 and is moved with the operation of the track 110 with parcels that are supplied to the track 110 loaded thereon such that the parcels are put into to the chutes 140 classified by destination groups to be discharged.

When a carrier 112 approaches a chute 140 into which the parcel loaded thereon is supposed to be put, the direction or the inclination of the carrier 112 is controlled through a carrier driving unit (not shown) in consideration of the movement speed of the track 110 so that the parcel can be put into the inlet 141 of the intended chute 140.

The carrier 112 further has a parcel arranger (centralizing sensor, not shown) arranging loaded parcels on the carrier 112. The parcel arranger may be provided in a bar or plate type to be able to appropriately press and release the sides of the parcels loaded on the carrier 112. The size, the intensity of pressing, etc. of the arranger are determined in accordance with the size (width, height, weight, etc.) of parcels.

Further, the plate or bar may be disposed in the carrier 112 to be protruded or hidden, if necessary, and may have a predetermined curvature or a variable curvature or a plurality of plates may be provided to overlap each other to be able to appropriately press substantially hexahedral parcels in close contact with the parcels.

A plurality of chutes 140 is provided at a side or both sides along the track 110 and parcels on the track 110 are discharged by the same destination groups to chutes. To this end, the chute 140 has an inlet 141 and an outlet 142. The chute 140 may be a spiral slide.

The 5-face image processor 150 reads out and transmits destination information of a parcel that can be marked on the parcel to the controller, and is configured to recognize and obtain characters, etc. attached to a parcel. Meanwhile, the destination information may be transmitted to the controller through a scanner, server, or the like separately configured in the loading line induction 125.

The 5-face image processor 150 recognizes and sorts parcel information by photographing parcels on the track 110 through a line scan camera, etc. In particular, unlike the 1-face image processor 124, the 5-face image processor 150 reads out parcel information marked on five sides including the top and four sides of a parcel except for the bottom being in contact with the track 110.

Further, the 5-face image processor 150 continuously senses the positions of parcels moved on the track 110 and transmits position information to the controller.

The controller determines chutes 140 to which the parcels on the track 110 are discharged, using the destination information and/or position information of the parcels transmitted from the 5-face image processor 150.

The feedback line 160 is configured as a conveyor and puts parcels not read out by the 5-face image processor 150 back to the track 110, and first and second feedback lines 160a and 160b are provided for the first and second tracks 110a and 110b, respectively.

The shortcut line 180 is a conveyor connecting the first and second tracks 110a and 110b that are two independent tracks to each other. When a parcel is read out by the 5-face image processor 150 as a parcel that has been put to a track that does not deal with the corresponding area, that is, a track to which the parcel is not supposed to be put, the parcel can be conveyed to another track 110 by the shortcut line 180.

Similarly, parcels can be moved to the corresponding shortcut line 180 by adjusting the inclination, movement direction, and speed of the carrier 112.

The shortcut line 180 is composed of first and second shortcut lines 180a and 180b at each stage. The first shortcut line 180a sends parcels from the second track 110b to the first track 110a and the second shortcut line 180b sends parcels from the first track 110a to the second track 110b.

In this case, the parcels supplied by the shortcut line 180 are put to the track 110 through the shortcut line induction 185.

Further, the shortcut line 180 is configured such that the metering conveyors 182 are sequentially spaced apart from each other at a portion before parcels enter the shortcut line induction 185. The 3-face image processor 184 that reads out parcel information marked on parcels is disposed at a side of the metering conveyors 182.

Accordingly, it is determined whether the parcel information read out by the 3-face image processor 184 of the metering conveyor 182 of the shortcut line 180 receiving the parcel is matched with parcel information and tracking information at the track 110 that sends a parcel, which has been put in wrong, to the wrong shortcut line 180. When they are not matched, the parcel identification number of the parcel is deleted and a new parcel identification number starting from a newly classified number level (e.g., 800 level) is given so that the parcel undergoes a tracking procedure later by the sensor unit 186.

Further, a sensor unit 186 that measures and transmits the lengths (and/or volumes) of parcels given parcel identification numbers to the controller is disposed at each part of the metering conveyor 182 through which parcels are introduced.

The controller compares in real time tracking information including the parcel identification numbers and lengths of parcels sequentially conveyed along the metering conveyors 182, and deletes the parcel identification numbers of parcels having a predetermined difference from the initially measured length values.

After parcels with the parcel identification numbers deleted in the tracking step by the sensor unit 186 are put to the track 110 through the shortcut line induction 185, parcel identification numbers starting from a newly classified number level (e.g., 900 level) are given in cooperation with the 5-face image processor 150 provided for the track 110.

For example, as for Korea, since parcels are concentrated in Gyeonggi-Incheon area including Seoul, the Gyeonggi-Incheon area is handled by the first track 110a and the other areas are handled by the second track 110b.

Large city centralization occurs at any place in the world in the work as long as people live there. For example, Jiansu in China is divided into two districts of Shanghai and Suzhou, and in Hebei around Beijing in China, cities are developed around Tenjin and Beijing and the other areas are not developed that much. In California of U.S.A., only LA and San Francisco are developed and the other areas are not developed, so population is biased around large cities at any places in the world. In consideration of this phenomenon, it is very useful to separately handle parcels through two tracks or loops being in charge of densely populated areas (or parcel-dense areas) and other areas, as compared with sorting all areas in Korea through one track 110 on the basis of destinations.

According to an embodiment, when a parcel that is supposed to be supplied to the first track 110a because the destination is the Gyeonggi-Incheon area including the capital region is supplied to the second track 110b by mistake, the parcel can be moved through the first shortcut line 180a that is a capital region delivery shortcut line connected to the first track 110a from the second track 110b.

In the opposite case, a parcel can be moved through the second shortcut line 180b that is a country region delivery shortcut line connected to the second track 110b from the first track 110a so that a parcel of which the destination has been read out wrong or that has been supplied to a wrong track not corresponding to the areas including the destination by mistake can be quickly and accurately sorted without circulating the track.

Meanwhile, when a parcel is moved through the first shortcut line 180a that is a capital region delivery shortcut line connected to the first track 110a from the second track 110b, parcel information and tracking information at the second track 110b sending a parcel that is put in wrong are transmitted through wired/wireless communication and it is determined whether the information is matched with parcel information read out by the 3-face image processor 184 of the metering conveyor 182 of the first shortcut line 180a receiving the parcel. When they are matched, the parcel undergoes a tracking procedure by the sensor unit 186, but when they are not matched, the parcel identification number of the parcel is deleted, a new parcel identification number is given, and then the parcel is moved to the sensor unit 186 to undergo the tracking procedure.

The number of the shortcut lines 180 is not limited and the tracks 110 are connected to each other at several points by the shortcut lines 180 to be able to send parcels supplied to the wrong track by area groups to intended tracks.

When it is not required to discriminate areas, the shortcut line 180 is disconnected, whereby the first track 110*a* and the second track 110*b* may be independently used, and only one track may be used, depending on needed situations.

Meanwhile, the track 110 composed of the first and second tracks 110*a* and 110*b* is installed in a plurality of stages up and down along a common vertical frame.

Accordingly, the loading induction 125, the carrier 112, the 5-face image processor 150, the feedback line 160, the shortcut line 180, etc. that are the components provided at or connected to each track 110 are provided for each stage.

The chute 140 is configured to connect the stages, the inlet 141 of the chute 140 is provided at each stage, and the outlet 142 is provided under the lowermost stage. Accordingly, parcels are put into the inlets 141 from the tracks 110*a* and 110*b* of each stage and are discharged to one outlet 142.

According to an embodiment, in the tracks 110 provided at three stages, respectively, the first stage and the second stage are configured to handle heavy parcels and the upper third stage is configured to handle small-size/light parcels. In this case, as shown in FIG. 4, small-size and light parcels are put in through a tipper in a large quantity for pile loading without a worker at the third stage and are supplied to the track 110 separately through a splitter and a hopper, whereby it is possible to sort a large amount of parcels in a small area.

Further, as shown in FIG. 2, at the second stage, parcels are supplied to the track through a cascade, a singulator, and a splitter for pile loading.

Further, the first stage for handling medium-size or larger parcels and the third stage for handling small-size parcels are connected through small-size/medium and large-size divergence supply lines 190, 190*a*, and 190*b*, whereby parcels that were supposed to be handled at respective stages but were supplied to other stages by mistake such as loading are returned.

Further, regardless of the feedback lines 160, 160*a*, and 160*b* configured at each stage, the first stage and the second stage handle medium-size and large-size parcels in the same way. Accordingly, the up-down feedback line 170 connecting the first stage and the second stage is composed of first and second feedback lines 170*a* and 170*b* connected to tracks at the upper and lower stages, respectively, for feedback, so when a handling speed difference, etc. are generated between the first stage and the second stage, the amount of parcels that can be handled by each stage can be adjusted.

Alternatively, all the first tracks 100*a* of the three stages may be designated to handle concentrated areas and only the second track 110*b* of one stage may be designated to handle other areas, which may be controlled through software by the controller.

As described above, two tracks are required to separately handle parcels. Accordingly, when a 3-stage sorting system is configured, as shown in the figures, 28 (12+6+10) loading lines 120, 6 (2+2+2) feedback lines 160 and 170, and 10 (2+4+4) shortcut lines 180, that is, a total of 44 lines are provided only for the main conveyor, and two hoppers, a platform for handling rejected parcels, etc. are included, so the system is densely configured in a small area.

Accordingly, the transverse sub-beams of the ceiling of a building were configured in three floors by optimizing the space configuration and are optimally hung in the air by being connected by beam supporters and hangers vertically extending from the sub-beams, and transverse beams were added in a ladder-type supporting way such that conveyor lines were designed and installed to operate across each other or parallel with each other. This complicate complex conveyor movement line is a complicated and difficult construction requiring detailed and precise manufacturing and installing, but the system was configured such that the entire is organically connected and operated.

In particular, 1500 pieces or more of steel supporting structures were used and cross support beams were designed doubly and triply, whereby conveyors crossing doubly and triply were installed and can be operated. This difficult construction could not be designed through 3D CAD introduced up to now, so many parts were constructed in a site-fit method. As a result, an optimal system that supports 3-stage track cross-belt sorter was invented for the first time in the world. Accordingly, a facility including this system was installed most efficiently and optimally in the world to include forty-four conveyor lines, two cross-belt tracks, two hoppers, and five or more platforms.

Meanwhile, this system is standardized and the design of a building is also standardized in accordance with the system. Problems of complicated manufacturing and installing of sub-beams that are included in construction can be solved by standardization, and inter-collision and contradictions when a building and machines are installed can be solved in advance.

Electrical facilities, control devices, and operation management software for the entire operation are also standardized. By standardizing all of these processes, it is possible to reduce the construction period of the parcel sorting system, improve the quality, reduce the construction costs, and reduce the examination period, and it is possible to decrease the total construction costs and maintenance costs.

As the result of designing and installing a system according to the present disclosure, it is possible for the first time to achieve a system that supports a parcel sorter that can increase the efficiency of a parcel sorter having parcel handling capacity per unit area (m2) per time (h) of 0.6 piece/m2/h or less in the related art up to 3.3 piece/m2/h.

Although the present disclosure was described above with reference to specific embodiments, the present disclosure is not limited to the embodiments and may be changed and modified in various ways by those skilled in the art without departing from the scope of the present disclosure.

According to the parcel sorting system and method of the present disclosure, since tracks of a parcel sorting apparatus are bound in one vertical frame in several stages up and down, two tracks are provided in parallel at each stage, and the tracks of each stages are connected to each other by a shortcut conveyor, the handling capacity per unit area (m2) of the parcel sorting system can be remarkably improved, whereby there is an effect that the system can be efficiently configured in a small area.

Further, since parcels are separated and classified by track groups for densely populated areas and other areas in consideration of population concentration on specific large cities that is natural, it is very efficient, as compared with putting-in and sorting are performed at one time.

Further, since the tracks are connected by the shortcut conveyor at each stage, there is an effect that a parcel that is put to a wrong track when a large quantity of parcel is put in is supplied to an appropriate track using the shortcut conveyor.

Further, even if one track is disconnected due to breakage, etc. at each stage, another independent track can be used, so at least 50% operation is possible, whereby there is an effect that continuous operation can be secured.

Further, one side of substantially hexahedral parcels moved on a track (the portion of the parcels being in contact with the track, the bottom) can be scanned, there is an effect that it is possible to read out parcel information (a barcode, a destination information, etc.) from all of the six sides of parcels moved on the conveyor.

Accordingly, even if a large quantity of packages is simultaneously put in without marks on the packages arranged through a singulator, there is an effect that it is possible to read all the six sides, so it is possible to considerably reduce the manpower and supply time for supplying packages, sorting time, etc.

What is claimed is:

1. A parcel sorting system comprising:
a track driven in a cross-belt type;
a loading line loading and conveying parcels to be sorted to the track;
a loading line induction putting parcels supplied by the loading line to the track; carriers disposed on the track and moved by operation of the track with the parcels thereon which have been put in;
a plurality of chutes disposed along the track so that the parcels on the track are discharged by the same destination groups;
a 5-face image processor disposed at a side of the track, reading out parcel information marked on the top and sides of parcels, and sensing the positions of parcels on the track;
a feedback line putting parcels not read out by the 5-face image processor back to the track; and
a controller determining chutes for discharging parcels using the parcel information transmitted from the 5-face image processor,
wherein the track includes a pair of first and second tracks provided to handle parcels for a first area with a density of parcel and a second area with a density of parcel less than the first area, respectively, and
the parcel sorting system further comprises:
a shortcut line connecting the first and second tracks so that parcels, which are not parcels for a corresponding area and have been put in wrong, can be conveyed to a corresponding track; and
a shortcut line induction putting parcels supplied by the shortcut line to the track.

2. The parcel sorting system of claim 1, wherein a plurality of metering conveyors is spaced apart from each other and sequentially disposed at a partial section before entering the loading line induction of the loading line, and
the parcel sorting system comprises a 1-face image processor installed under the metering conveyors, reading out the parcel information marked on the bottom of the parcel through the gap between the metering conveyors, and then transmitting the parcel information to the controller.

3. The parcel sorting system of claim 2, wherein simultaneously with reading-out by the 1-face image processor, a parcel identification number is sequentially given to parcels that are put to the loading line, and
a sensor unit that measures and transmits lengths of parcels given the parcel identification numbers to the controller is disposed at each parcel inlet of the metering conveyors.

4. The parcel sorting system of claim 3, wherein the controller compares in real time tracking information including the parcel identification numbers and lengths of parcels sequentially conveyed along the metering conveyors, and deletes the parcel identification numbers of parcels having a predetermined difference from initially measured length values, and
gives a parcel identification number starting with a newly classified number level to a parcel that is put to the track with the parcel identification number deleted in cooperation with the 5-face image processor provided for the track.

5. The parcel sorting system of claim 1, wherein metering conveyors are spaced apart from each other and sequentially disposed at a partial section before entering the shortcut line induction of the shortcut line, and
a 3-face image processor that reads out parcel information marked on parcels is disposed at a side of the metering conveyor, it is determined whether parcel information at the track sending a parcel to the shortcut line and parcel information read out by the metering conveyor of the shortcut line receiving the parcel coincide with each other, and when the items of information do not coincide with each other, the parcel is given a parcel identification number starting with a newly classified number level.

6. The parcel sorting system of claim 5, wherein a sensor unit that measures and transmits lengths of parcels given parcel identification numbers to the controller is disposed at each parcel inlet of the metering conveyors, and
the controller compares in real time tracking information including the parcel identification numbers and lengths of parcels sequentially conveyed along the metering conveyors, and puts parcels having a predetermined difference from initially measured length values to the track with the parcel identification numbers of the parcels deleted, and then gives parcel identification numbers starting from a newly classified number level in cooperation with the 5-face image processor provided for the track.

7. The parcel sorting system of claim 1, wherein the track composed of the first and second tracks is installed in a plurality of stages up and down along a vertical frame, and
the chute provided along the first and second tracks at each stage has an inlet into which parcels are put at each stage and connects the stages such that parcels are discharged to one outlet provided under the lowermost stage.

8. The parcel sorting system of claim 7, wherein the shortcut line is composed of first and second shortcut lines at each stage, the first shortcut line sends parcels from the second track to the first track, and the second shortcut line sends parcels from the first track to the second track.

9. The parcel sorting system of claim 7, wherein a plurality of parcels of a first size and weight are put to the upper track of the tracks provided in a plurality of stages through a tipper without a worker.

10. The parcel sorting system of claim 7, wherein the loading line, the feedback line, and the shortcut line including the tracks, which are provided in a plurality of stage, and configured as conveyors are connected and hung in the air by beam supporters and hangers vertically extending from transverse sub-beams of the ceiling of a building in which the system is supposed to be installed, and are configured to operate across each other or in parallel with each other.

11. The parcel sorting system of claim 7, wherein a plurality of parcels of a first size and weight are put to the upper track of the tracks provided in a plurality of stages through a tipper without a worker, and a plurality of parcels of a second size and weight are put to the track other than the upper track of the tracks provided in a plurality of stages through a tipper without a worker.

* * * * *